June 1, 1965 E. V. SUNDT 3,186,219
TORQUE METER
Filed Nov. 22, 1960 2 Sheets-Sheet 1

INVENTOR.
Edward V. Sundt
BY Wallenstein, Spangenberg
& Hattis
attys.

June 1, 1965 E. V. SUNDT 3,186,219
TORQUE METER
Filed Nov. 22, 1960 2 Sheets-Sheet 2
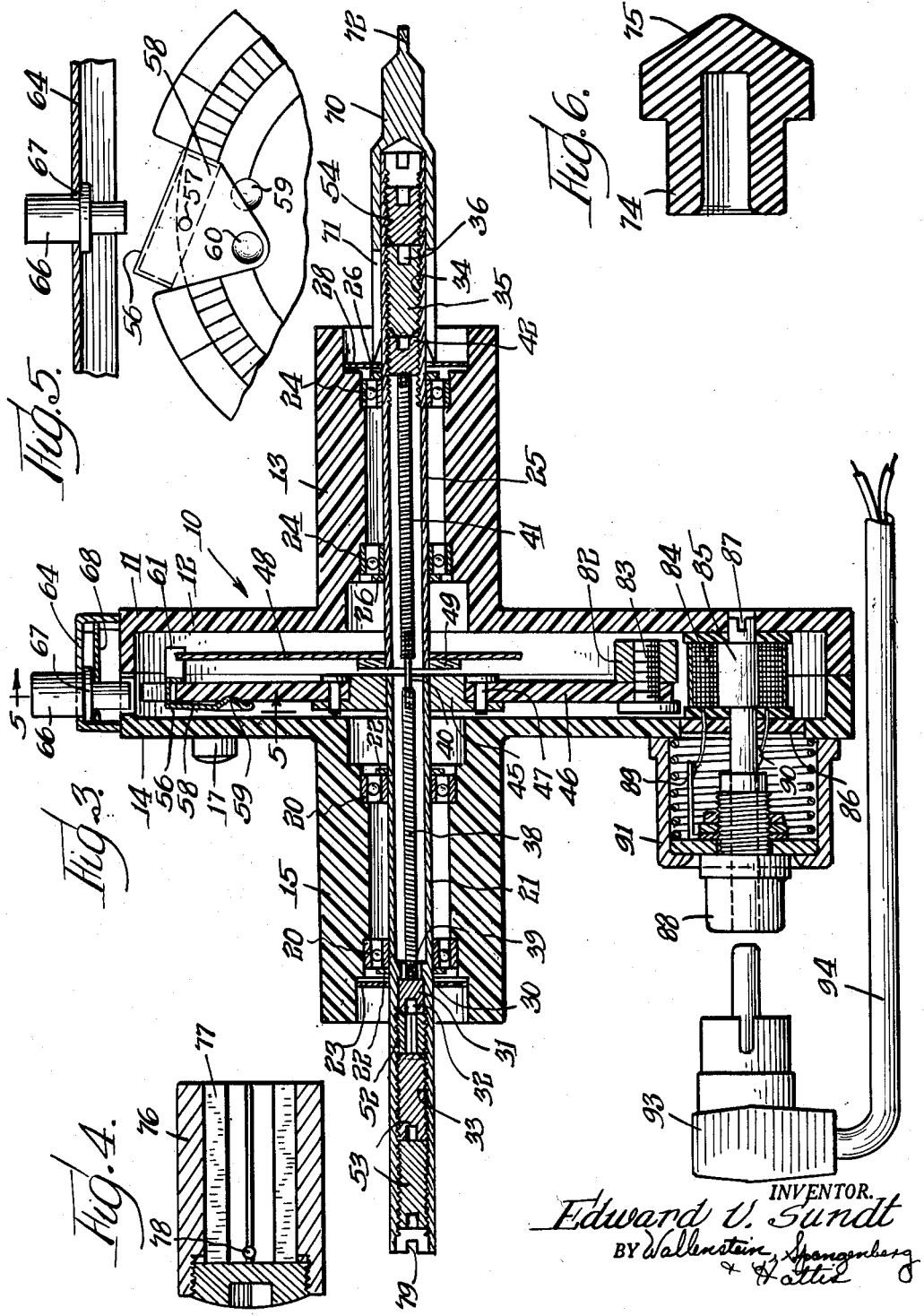
INVENTOR.
Edward V. Sundt
BY Wallenstein, Spangenberg
& Hattis

United States Patent Office 3,186,219
Patented June 1, 1965

3,186,219
TORQUE METER
Edward V. Sundt, 1865 Miner St., Des Plaines, Ill.
Filed Nov. 22, 1960, Ser. No. 71,092
10 Claims. (Cl. 73—136)

The principal object of this invention is to provide an improved torque meter which is capable of reading extremely low torques, as for example, torque values from about 0.25 gram per centimeter and up, which is simple and rugged in construction and accurate and foolproof in operation, which is particularly suited for measuring torques in the building, testing and servicing of servomotors and generators, small motors and gear trains, watch and clock hairsprings, ball bearings, and similar equipment, which is capable of reading both static and rotating torques, which may be readily read from either side, and which is bi-directional in operation for reading torques in either clockwise or counter-clockwise directions.

Further objects of this invention reside in the details of construction of the torque meter and in the cooperative relationships between the component parts thereof.

Other objects and advantages will become apparent to those skilled in the art upon reference to the accompanying specification, claims and drawings in which:

FIG. 3 is a vertical sectional view taken substantially along the line 3—3 of FIG. 1.

FIG. 4 is a sectional view illustrating a knurled knob which may be utilized for manually operating the torque meter.

FIG. 5 is a partial sectional view taken substantially along the line 5—5 of FIG. 3.

FIG. 6 is a sectional view through another form of drive tip or coupler which may be utilized with the torque meter.

Figure 1:
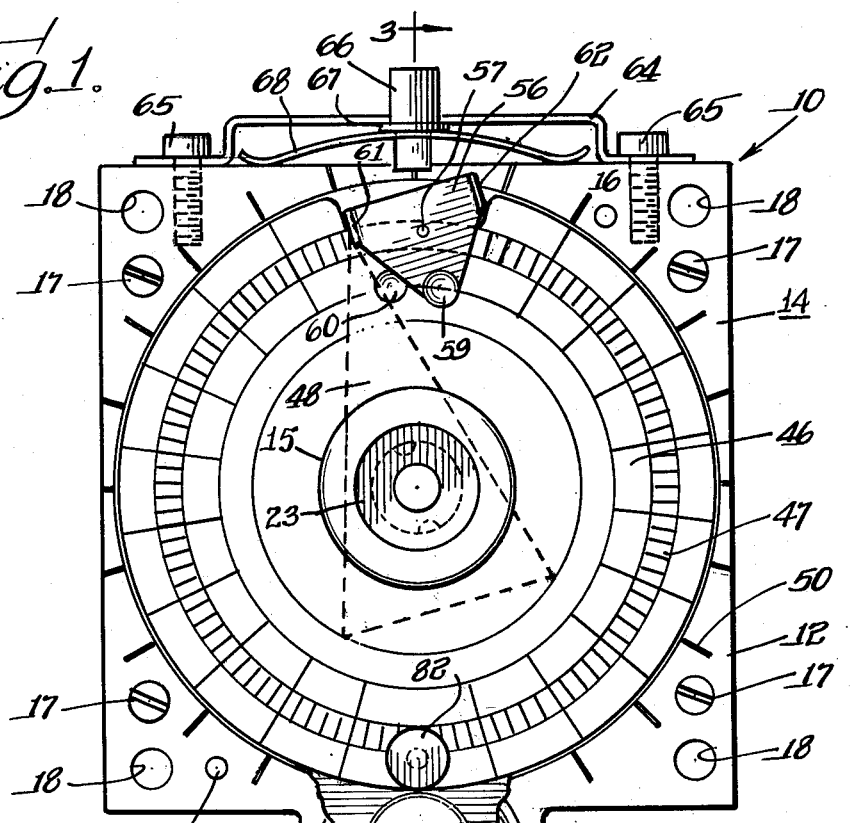
FIG. 1 is an end elevational view of the torque meter as it appears from the left of FIG. 3.
Figure 2:
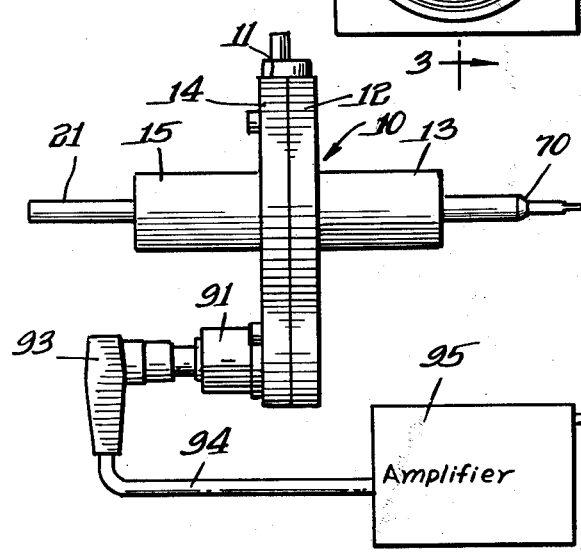
FIG. 2 is a side elevational view of the torque meter showing it in association with a stroboscope lamp.

Referring first to FIGS. 1, 2 and 3, the torque meter of this invention is generally designated at 10. It includes a supporting means or housing 11 formed in two parts which are secured together, one part being indicated at 12 and having a hollow cylindrical extension 13, and the other part being indicated at 14 and having a hollow cylindrical extension 15. The parts of the housing are preferably formed of a transparent thermoplastic material, such as, clear acrylic Plexiglas or Lucite. As a result, at least a portion of the housing 11 is transparent so that the parts therein may be readily seen. In securing the parts 12 and 14 of the housing 11 together, the parts are accurately aligned by pins 16 and are secured together by means of screws 17. The housing 11 may be provided with a plurality of through holes 18 for forming mounting means for the torque meter, if mounting is desired.

A pair of ball bearings 20 are suitably secured in the cylindrical extension 15 of the housing 14 for rotatably mounting a driving member 21 in the form of a tube. Snap rings 22 are secured to the tube 21 for longitudinally positioning the tube 21 in the ball bearings 20. The end of the cylindrical extension 15 is closed by a suitable washer 23. In a like manner, the cylindrical extension 13 of the housing part 12 also carries a pair of ball bearings 24 for rotatably mounting a driven load member 25 in the form of a tube. The tube 25 is secured against longitudinal movement in the ball bearings 24 by means of snap rings 26. The end of the cylindrical extension 13 is also closed by a washer 28.

The tube of the driving member 21 is provided with an internal annular shoulder 30 which is abutted by an anchor member 31 rotatably received in the tube 21. The anchor member 31 is provided with a screw driver slot 32 so that it may be manually rotated in the tube 21 for adjusting purposes. Outwardly from the anchor member 31 the tube 21 is provided with internal screw threads 33. The tube of the driven load member 25 is provided at its outer end with internal screw threads 34 which screw threadedly receive an anchor screw 35 provided with a screw driver slot 36. Arranged between the anchor member 31 and the anchor screw 35 is a resilient torque transmitting member for rotating the driven load member 25 upon rotation of the driving member 21. This resilient torque transmitting member includes a helical spring 38 which is secured at one end to the anchor member 31, as indicated at 39, and which is secured at its other end to a short rod 40. It also includes another helical spring 41 which is secured at one end to the short rod 40 and at its other end to the anchor screw 35, as indicated at 42. Thus, torque is transmitted from the driving member 21 to the driven load member 25, and the angular displacement of the driving member 21 with respect to the driven load member 25 is dependent upon the torque requirement to drive the driven load member. It is well known that a helical spring, when twisted a full turn in the tightening direction, will shorten by the distance of one turn, and that when it is twisted in the opposite direction, it lengthens by that amount. A single length of helical spring would thus impose a varying thrust load on the ball bearings 20 and 24 if used. In accordance with this invention, the helical springs 38 and 41 are wound in opposite directions so that a completely balanced, compensated resilient torque transmitting member is provided which will not expand or contract upon change in torque. Also in accordance with this invention, the respective helical springs 38 and 41 are preferably made of slightly different diameter, or turns per inch, or length, and thus throw their natural frequency or oscillation constants out of phase. This reduces the tendency of the helical springs 38 and 41 to oscillate under rotating loads and permits easier reading of the torque meter.

Also, in accordance with this invention, it is desirable to place the helical springs 38 and 41 under a predetermined tension which provides a firm connection between the driving member 21 and the driven load member 25 with minimum back lash or lost motion. This is accomplished by manipulation of the anchor screw 35 and the anchor member 31. Towards this end, the anchor screw 35 is rotated in the screw threads 34 by a screw driver operating in the driver slot 36 for longitudinally moving the anchor screw 35 in the screw threaded tube 25 to lengthen the springs 38 and 41. As the anchor screw 35 is so turned for adjustment purposes, the rotatably mounted anchor member 31 is correspondingly turned by means of a screw driver operating in the driver slot 32 so as not to produce any torsional effect in the springs 38 and 41. In this way, the longitudinal tension in the springs 38 and 41 may be adjusted to the desired value without placing any torsional effect therein, which would otherwise appear in the reading of the torque meter. After the desired tension adjustment is thus obtained, the anchor screw 35 is locked in position by a lock screw 54 screw threadedly received in the screw threads 34, and the anchor member 31 is locked in position by a lock screw 52 screw threadedly received in the screw threads 33. Screw plugs 53 may be screw threadedly received in the end of the tube 21 of the driving member for providing body thereto and reinforcing the same. The characteristics of the springs 38 and 41, such as, wire size, diameter, length, number of turns, or resiliency, are selected in accordance with the range of torque to be measured and indicated by the torque meter, and such springs of such different characteristics may be readily incorporated in the torque meter.

A hub 45 is suitably secured to the inner end of the tube 21 of the driving member and preferably this hub 45 is formed of aluminum or the like. A dial 46 is in turn suitably secured to the hub 45 by means of rivets 47 so that the dial 46 is rotated in accordance with the rotation of the driving member 21. The dial 46 which is visible through the transparent housing 11 is provided with suitable graduations and indicia 47 which are calibrated in accordance with torque. Preferably, the dial 46 is transparent and towards this end it may be formed from a transparent thermoplastic material, such as, clear acrylic Plexiglas or Lucite, so that the dial may be read from either side through the transparent housing. A pointer 48 is suitably secured to the inner end of the tube of the driven load member 25 and this pointer 48 cooperates with the graduations and indicia on the dial 46 for indicating the relative angular displacement of the driving member 21 and the driven load member 25 and, hence, the torque. The inner end of the tube of the driven load member 25 also has a magnet 49 secured thereto, this magnet being appropriately magnetized to cooperate with the aluminum hub 45 for inducing damping eddy currents therein. Thus, changes in relative positions of the driving member 21 and the driven load member 25 are retarded by the action of the hub 45 and magnet 49 to provide effective damping of oscillations between said members. This arrangement is especially helpful in connection with the measurement of very light torques where the mass to spring ratio of the moving system is high. The housing 11 may also be provided with suitable indicia 50 for indicating relative angular positions of the pointer 48 with respect to the housing.

The dial 46 is provided with a slot in its periphery for receiving a stop member 56 which is suitably pivoted to the dial by a pivot pin 57. This stop member 56 is provided with an extension 58 having a detent portion on the inner end thereof which is adapted to be alternately received in a pair of detent recesses 59 and 60 in the dial 46. Thus, the stop member 56 may be pivoted from one position as shown in FIG. 1 to the opposite position as shown in FIG. 5, and it is maintained in these alternate positions by the detent recesses 59 and 60. The stop member 56 carries a pair of stops 61 and 62 which may be alternately swung into the path of movement of the pointer 48. A subhousing 64 is secured on the top of the torque meter by means of screws 65 for slidably carrying a plunger 66 having a stop shoulder 67. A leaf spring 68, interposed between the torque meter housing 11 and the shoulder 67 of the plunger 66, normally maintains the plunger in retracted position, as shown. The plunger 66 may be depressed through an opening in the housing 11 for moving the stop member 56 between its alternate stop positions when the stop member 56 is suitably arranged below the plunger 66.

When the stop member 56 is in the position illustrated in FIG. 1, the stop 61 is engaged by the pointer 48 and the pointer is zeroed thereby with a slight amount of torque tension applied thereto. When the driving member is rotated in a clockwise direction, as viewed in FIG. 1, the dial 46 is rotated in a clockwise direction, and depending upon the amount of torque, the driven load member 25, and hence the pointer 48, lag behind the dial 46, the pointer then indicating on the dial the amount of clockwise torque. When the stop member 56 is positioned to the opposite position and the pointer 48 engages the outside of the stop 62, torque is correspondingly indicated by the relative positions of the dial 42 and pointer 48 for counterclockwise torques. In this way, the torque meter of this invention may accurately indicate torque either in the clockwise direction or the counterclockwise direction.

To connect the driven load member 25 of the torque meter to a rotatable device for measuring the torque to drive the same, a coupler 70 may be secured to the outer end of the driven load member 25. Here, the coupler may be formed of a suitable metal and it may be slotted at its inner end, as indicated at 71, for firmly resiliently gripping the driven load member 25 so as to be turned therewith. The outer end of the coupler 70 may be provided with a driver blade 72 for coupling to a driver slot in a rotating part of the device to be tested. Another type of coupler or driving tip may be utilized, such as illustrated in FIG. 6. Here, the coupler 74 may be made of rubber or the like and may be tightly fitted over the outer end of the driven load member 25 so as to turn therewith. The coupler 74 may be provided with a conical end 75 for frictionally engaging a rotating part of the device to be tested.

The driving member 21 of the torque meter may be manually rotated for measuring static torque or it may be continuously power rotated for measuring rotating torques. Where static torques are to be meausred and indicated, a knurled knob 76 having internal slots 77 may be fitted over the outer end of the driving member 21. To assure against slipping of the knob 76, a pin 78 carried thereby may be received in a notch 79 in the outer end of the driving member 21. Thus, gripping the knurled knob 76 the driving member 21 may be manually rotated for measuring the static torque of the device coupled to the driven rod member 25, this measurement being determined by the relative positions of the dial 46 and pointer 48.

Where continuous rotating torques are to be measured, the driving member 21 may be continuously rotated at a desired speed from a suitable power source, such as, an electric motor or the like. In order to read the relative positions of the dial 46 and pointer 48 for continuous rotating torques, a stroboscope lamp is utilized. In this connection, an iron nut 82 is secured to the dial 46 by a screw 83 opposite to the pivoted stop member 56. Incidentally, the iron nut 82 operates to counterbalance the weight of the pivoted stop member 56 during high speed rotation of the dial 46. The iron nut 82 cooperates with a coil 84 carried by a core 85 mounted in a washer 86 which in turn is suitably secured in the housing part 14. The coil and core are eccentrically arranged, so that by manipulating the coil assembly with a screw driver engaging in a driving slot 87 therein, the coil 84 may be brought nearer to or farther away from the iron nut 82 for adjusting the sensitivity of the effect of the iron nut 82 on the coil 84. Electrical connections to the coil 84 are made through a jack 88 carried by a jack housing 91. One lead of the coil 84 is connected at 89 to one portion of the jack and the other lead is connected at 90 to another portion of the jack. Each time that the iron nut 82 passes the coil 84, the inductance of the coil 84 is changed to produce an electrical signal at the jack 88. This electrical signal is conducted from the jack 88 through a suitable cooperating plug 93 and cable 94 to an amplifier 95, as illustrated in FIG. 2. The amplifier 95 operates through a cable 96 a stroboscope light 97 suitably carried by a base 98, the stroboscope light 97 being fired or flashed each time that the iron nut 82 passes the coil 84. When the stroboscope lamp 97 is played upon the dial 46 and pointer 48 through the transparent housing, it operates to stationarily display the relative positions of the dial 46 and pointer 48, even though they are rapidly rotating, for indicating the instantaneous torque of the rotating torque meter elements. By reason of the torque meter of this invention extremely low torques may be measured and indicated, as for example, torque values from 0.25 gram per centimeter and up, and rotating torques up to 10,000 r.p.m. are conveniently measured.

While for purposes of illustration one form of this invention has been disclosed, other forms thereof may become apparent to those skilled in the art upon reference to this disclosure and, therefore, this invention is to be limited only by the scope of the appended claims.

I claim as my invention:

1. A torque meter comprising a stationary supporting means, a driving member rotatably mounted in the supporting means, a driven load member rotatably mounted in the supporting means in alignment with the driving member, a resilient torque transmitting member connected between the driving member and the driven load member for rotating the driven load member upon rotation of the driving member, the angular displacement of the driving member with respect to the driven load member being dependent upon the torque required to drive the driven load member, indicating means including a graduated dial carried by the driving member and a cooperating pointer carried by the driven load member for indicating the angular displacement of the driving member and the driven load member and hence the torque, and a movable stop carried by the disc and engaged on one side or the other thereof by the pointer for zeroing the pointer with respect to the disc and providing for torque measurement for either direction of rotation of the driving member, and damping means including cooperating damping devices carried by the driving member and the driven load member for damping angular oscillations between said members, a stroboscope light for the indicating means, and means controlled by the driving member for firing the stroboscope light upon each revolution of the driving member for stationarily displaying the rotating indicating means.

2. A torque meter for measuring torque in one direction or the opposite direction comprising a stationary supporting means, a driving member rotatably mounted in the supporting means, a driven load member rotatably mounted in the supporting means in alignment with the driving member, a resilient torque transmitting member connected between the driving member and the driven load member for rotating the driven load member upon rotation of the driving member and including two oppositely wound helical springs connected together at one of their ends and connected at their other ends to the driving member and the driven load member, respectively, the direction and extent of angular displacement of the driving member with respect to the driven load member being dependent upon the direction and amount of torque required to drive the driven load member, said oppositely wound helical springs alternately coiling and uncoiling respectively for different directions of the transmitted torque for providing uniform torque measurement for both directions of torque, and cooperating graduated indicating means on the driving member and the driven load member for indicating the direction and extent of angular displacement of the driving member and the driven load member and hence the direction and amount of torque.

3. A torque meter comprising a stationary supporting means, a driving member rotatably mounted in the supporting means, a driven load member rotatably mounted in the supporting means in alignment with the driving member, a resilient torque transmitting member connected between the driving member and the driven load member for rotating the driven load member upon rotation of the driving member and including two oppositely wound helical springs connected together at one of their ends and connected at their other ends to the driving member and the driven load member, respectively, means for placing said springs under desired tension, the angular displacement of the driving member with respect to the driven load member being dependent upon the torque required to drive the driven load member, and cooperating graduated indicating means on the driving member and the driven load member for indicating the angular displacement of the driving member and the driven load member and hence the torque.

4. A torque meter for measuring torque in one direction or the opposite direction comprising a stationary supporting means, a driving member rotatably mounted in the supporting means, a driven load member rotatably mounted in the supporting means in alignment with the driving member, a resilient torque transmitting member connected between the driving member and the driven load member for rotating the driven load member upon rotation of the driving member and including two oppositely wound helical springs connected together at one of their ends and connected at their other ends to the driving member and the driven load member, respectively, the direction and extent of angular displacement of the driving member with respect to the driven load member being dependent upon the direction and amount of torque required to drive the driven load member, said oppositely wound helical springs alternately coiling and uncoiling respectively for different directions of the transmitted torque for providing uniform torque measurement for both directions of torque, cooperating graduated indicating means on the driving member and the driven load member for indicating the direction and extent of angular displacement of the driving member and the driven load member and hence the direction and amount of torque, and damping means including cooperating damping devices carried by the driving member and the driven load member for damping angular oscillations between said members and providing stabilized torque measurement.

5. A torque meter comprising a stationary supporting means, a driving member rotatably mounted in the supporting means, a driven load member rotatably mounted in the supporting means in alignment with the driving member, a resilient torque transmitting member connected between the driving member and the driven load member for rotating the driven load member upon rotation of the driving member and including two oppositely wound helical springs connected together at one of their ends and connected at their other ends to the driving member and the driven load member, respectively, means for placing said springs under desired tension, the angular displacement of the driving member with respect to the driven load member being dependent upon the torque required to drive the driven load member, cooperating graduated indicating means on the driving member and the driven load member for indicating the angular displacement of the driving member and the driven load member and hence the torque, and damping means including cooperating damping devices carried by the driving member and the driven load member for damping angular oscillations between said members.

6. A torque meter for measuring torque in one direction or the opposite direction comprising a stationary supporting means, a driving member rotatably mounted in the supporting means, a driven load member rotatably mounted in the supporting means in alignment with the driving member, a resilient torque transmitting member connected between the driving member and the driven load member for rotating the driven load member upon rotation of the driving member and including two oppositely wound helical springs connected together at one of their ends and connected at their other ends to the driving member and the driven load member, respectively, the direction and extent of angular displacement of the driving member with respect to the driven load member being dependent upon the direction and amount of torque required to drive the driven load member, said oppositely wound helical springs alternately coiling and uncoiling respectively for different directions of the transmitted torque for providing uniform torque measurement for both directions of torque, indicating means including a graduated dial carried by the driving member and a cooperating pointer carried by the driven load member for indicating the direction and extent of angular displacement of the driving member and the driven load member and hence the direction and amount of torque, and a movable stop carried by the disc and manually positioned to be engaged on one side or the other thereof by the pointer depending upon the direction of the torque to be measured for correspondingly zeroing the pointer with respect to the disc and providing for stabilized torque measurement for either direction of rotation of the driving member.

7. A torque meter for measuring torque in one direction or the opposite direction comprising a stationary supporting means, a driving member rotatably mounted in the supporting means, a driven load member rotatably mounted in the supporting means in alignment with the driving member, a resilient torque transmitting member connected between the driving member and the driven load member for rotating the driven load member upon rotation of the driving member and including two oppositely wound helical springs connected together at one of their ends and connected at their other ends to the driving member and the driven load member, respectively, the direction and extent of angular displacement of the driving member with respect to the driven load member being dependent upon the direction and amount of torque required to drive the driven load member, said oppositely wound helical springs alternately coiling and uncoiling respectively for different directions of the transmitted torque for providing uniform torque measurement for both directions of torque, indicating means including a graduated dial carried by the driving member and a cooperating pointer carried by the driven load member for indicating the direction and extent of angular displacement of the driving member and the driven load member and hence the direction and amount of torque, a movable stop carried by the disc and manually positioned to be engaged on one side or the other thereof by the pointer depending upon the direction of the torque to be measured for correspondingly zeroing the pointer with respect to the disc and providing for stabilized torque measurement for either direction of rotation of the driving member, and damping means including cooperating damping devices carried by the driving member and the driven load member for damping angular oscillations between said members for also providing stabilized torque measurement.

8. A torque meter for measuring torque in one direction or the opposite direction comprising, a stationary supporting means, a driving member including a tube, ball bearings for rotatably mounting the driving member in the support means, a driven load member in alignment with the driving member and including a tube, ball bearings for rotatably mounting the driven load member in the support means, a resilient torque transmitting member connected between the driving member and the driven load member for rotating the driven load member and including two oppositely wound helical springs connected together at one of their ends and extending through the tubes and connected at their other ends to the driving member and the driven load member, respectively, adjacent the outer ends of the tubes thereof, the direction and extent of angular displacement of the driving member with respect to the driven load member being dependent upon the direction and amount of torque required to drive the driven load member, said oppositely wound helical springs alternately coiling and uncoiling respectively for different directions of the transmitted torque for providing uniform torque measurement for both directions of torque, indicating means including a graduated dial carried by the inner end of the tube of the driving member and a cooperating pointer carried by the inner end of the tube of the driven load member for indicating the direction and extent of angular displacement of the driven member and the driven load member and hence the direction and amount of torque.

9. A torque meter comprising, a stationary supporting means, a driving member including a tube, ball bearings for rotatably mounting the driving member in the support means, a driven load member in alignment with the driving member and including a tube, ball bearings for rotatably mounting the driven load member in the support means, a resilient torque transmitting member connected between the driving member and the driven load member for rotating the driven load member and including two oppositely wound helical springs connected together at one of their ends and extending through the tubes and means including adjusting means for connecting the other ends of the springs to the tubes of the driving member and the driven load member, respectively, adjacent the outer ends thereof, said adjusting means providing desired tension in the springs, the angular displacement of the driving member with respect to the driven load member being dependent upon the torque required to drive the driven load member, indicating means including a graduated dial carried by the inner end of the tube of the driving member and a cooperating pointer carried by the inner end of the tube of the driven load member for indicating the angular displacement of the driven member and the driven load member and hence the torque.

10. A torque meter for measuring torque in one direction or the opposite direction comprising, a stationary supporting means, a driving member including a tube, ball bearings for rotatably mounting the driving member in the support means, a driven load member in alignment with the driving member and including a tube, ball bearings for rotatably mounting the driven load member in the support means, a resilient torque transmitting member connected between the driving member and the driven load member for rotating the driven load member and including two oppositely wound helical springs connected together at one of their ends and extending through the tubes and connected at their other ends to the driving member and the driven load member, respectively, adjacent the outer ends of the tubes thereof, the direction and extent of angular displacement of the driving member with respect to the driven load member being dependent upon the direction and amount of torque required to drive the driven load member, said oppositely wound helical springs alternately coiling and uncoiling respectively for different directions of the transmitted torque for providing uniform torque measurement for both directions of torque, indicating means including a graduated dial carried by the inner end of the tube of the driving member and a cooperating pointer carried by the inner end of the tube of the driven load member for indicating the direction and extent of angular displacement of the driven member and the driven load member and hence the direction and amount of torque, and damping means including cooperating damping devices carried by the inner ends of the tubes of the driving member and the driven load member for damping angular oscillations between said members for providing stabilized torque measurement.

References Cited by the Examiner

UNITED STATES PATENTS

| | | | |
|---|---|---|---|
| 2,256,478 | 9/41 | Hill | 73—139 |
| 2,260,036 | 10/41 | Kuehni | 73—136 |
| 2,521,905 | 9/50 | Feller | 73—136 |
| 2,550,693 | 5/51 | Hart | 73—136 |
| 2,602,330 | 7/52 | Kollsman | 73—194 |
| 2,629,256 | 2/53 | Rank | 73—136 |
| 2,649,010 | 8/53 | Corry | 73—133 |
| 2,658,181 | 11/53 | Holmes et al. | 310—93 X |
| 2,802,122 | 8/57 | Riordan et al. | 310—93 |
| 2,811,853 | 11/57 | Friedman | 73—136 |
| 3,039,301 | 6/62 | Leto et al. | 73—136 |

FOREIGN PATENTS 869,875    3/53    Germany.

RICHARD C. QUEISSER, *Primary Examiner.*

ROBERT L. EVANS, JOSEPH P. STRIZAK, *Examiners.*